United States Patent
Sagara et al.

(10) Patent No.: US 8,895,336 B2
(45) Date of Patent: Nov. 25, 2014

(54) METHOD OF MANUFACTURING INFRARED LIGHT-EMITTING ELEMENT

(75) Inventors: Akihiko Sagara, Osaka (JP); Miori Hiraiwa, Osaka (JP); Satoshi Shibata, Osaka (JP)

(73) Assignee: Panasonic Corporation, Osaka (JP)

(*) Notice: Subject to any disclaimer, the term of this patent is extended or adjusted under 35 U.S.C. 154(b) by 51 days.

(21) Appl. No.: 13/616,972

(22) Filed: Sep. 14, 2012

(65) Prior Publication Data

US 2013/0011950 A1    Jan. 10, 2013

Related U.S. Application Data

(63) Continuation of application No. PCT/JP2012/001312, filed on Feb. 27, 2012.

(30) Foreign Application Priority Data

Feb. 28, 2011  (JP) ................... 2011-041353

(51) Int. Cl.
*H01L 33/34*  (2010.01)
*C01B 33/12*  (2006.01)

(52) U.S. Cl.
CPC ..................... *C01B 33/12* (2013.01)
USPC ........................................ 438/45

(58) Field of Classification Search
None
See application file for complete search history.

(56) References Cited

U.S. PATENT DOCUMENTS

| | | | |
|---|---|---|---|
| 4,897,154 A * | 1/1990 | Chakravarti et al. ......... 438/476 |
| 5,077,143 A | 12/1991 | Barraclough et al. |
| 5,212,101 A | 5/1993 | Canham et al. |
| 2003/0164139 A1* | 9/2003 | Kobayashi et al. ............ 117/84 |
| 2006/0134872 A1 | 6/2006 | Hattendorf et al. |
| 2008/0128713 A1 | 6/2008 | Saito et al. |
| 2011/0306193 A1* | 12/2011 | Krull et al. .................... 438/515 |

FOREIGN PATENT DOCUMENTS

| | | |
|---|---|---|
| JP | 55-012740 A | 1/1980 |
| JP | H02-503495 A | 10/1990 |
| JP | H04-504634 A | 8/1992 |
| JP | 2007-294628 A | 11/2007 |
| JP | 2008-524858 A | 7/2008 |

OTHER PUBLICATIONS

Magnea et al., "Luminescence of carbon and oxygen related complexes in annealed silicon" Centre d'Etudes Nucleaires de Grenoble, Département de Recherche Fondamentale, Section de Physique du Solide, 85 X-38041 Grenoble Cedex, France, pp. 60-62 (Apr. 10, 1984).

Trombetta et al., "Identification of an interstitial carbon-interstitial oxygen complex in silicon" Applied Physics Letters, vol. 51, Issue 14, Oct. 5, 1987, pp. 1103-1105.

(Continued)

*Primary Examiner* — Charles Garber
*Assistant Examiner* — Stanetta Isaac
(74) *Attorney, Agent, or Firm* — McDermott Will & Emery LLP (57) ABSTRACT

To provide a method of manufacturing an infrared light-emitting element having a wavelength of 1.57 μm, including: forming a $SiO_2$ film on a Si substrate containing C; and performing RTA treatment in an atmosphere containing oxygen, or implanting impurity ions therein and thereafter performing RTA treatment in an atmosphere containing oxygen, thereby forming C centers.

12 Claims, 6 Drawing Sheets

(56) References Cited

OTHER PUBLICATIONS

Franzo et al., "Room-temperature electroluminescence from Er-doped crystalline Si" Applied Physics Letters, vol. 64, Issue 17, Apr. 25, 1994, pp. 2235-2237.

Nakamura et al., "Enhanced photoluminescence detection of oxygen in silicon crystal by formation of a carbon-oxygen complex through carbon implantation and electron irradiation" Journal of Applied Physics, vol. 78, Issue 7, Oct. 1, 1995, pp. 4407-4410.

Cloutier et al., "Optical gain and stimulated emission in periodic nanopatterned crystalline silicon" Nature Materials 4, 887-891 (2005).

International Search Report mailed Mar. 27, 2012 issued in corresponding International Application No. PCT/JP2012001312.

* cited by examiner

METHOD OF MANUFACTURING INFRARED LIGHT-EMITTING ELEMENT

RELATED APPLICATIONS

This application is a Continuation Application of International Application No. PCT/JP2012/001312, filed on Feb. 27, 2012, which in turn claims the benefit of Japanese Application No. 2011-041353, filed on Feb. 28, 2011, the disclosures of which Applications are incorporated by reference herein.

TECHNICAL FIELD

The present invention relates to a method of manufacturing an infrared light-emitting element.

BACKGROUND ART

Silicon (Si)-based LSIs (Large Scale Integration) include copper wires or the like as internal interconnects, and therefore have problems such as interconnect delay and temperature rise due to the generation of Joule heat.

In recent years, for the purpose of reducing interconnect delay and the like, there have been developed optoelectronic integrated circuits using optical interconnects as the internal interconnects.

In order to realize an optoelectronic integrated circuit, it is necessary to fabricate conventional elements such as a Complementary Metal Oxide Semiconductor field effect transistor (CMOS) and optical elements such as a light-emitting element on a LSI chip together.

Accordingly, the above-described optical elements are preferably fabricated by using a Si-based material.

In addition, in order to reduce data loss during communication, the wavelength used for optical communication is preferably around 1.55 μm, the minimum loss wavelength region of optical fibers. Thus, the performance required of a light-emitting element is to have a light-emitting wavelength of around 1.55 μm.

Based on the background described above, a light-emitting element using light emission at 1.53 μm generated from Si with a rare earth element, in particular erbium (Er), added thereto has been recently studied for practical use. Trivalent ions of the added Er are known to be bonded to oxygen (O) atoms in Si to emit light. For example, G. Franzo et al. have succeeded in the observation of room-temperature electroluminescence from a material with both of Er and O added thereto (See Non-PTL 1).

Meanwhile, there has been developed a light-emitting element using light emission from crystal defects formed in Si. For example, S. G.

Cloutier et al. have confirmed optical gain and stimulated emission of light emission at a wavelength of 1.28 μm, wherein luminescence centers are point defects of substitutional carbon (C) atoms and interstitial Si atoms caused by ion bombardment (See Non-PTL 2).

CITATION LIST

Non-Patent Literatures

Non-PTL 1: G. Franzo, F. Priolo, S. Coffa, A. Polman and A. Camera, Appl. Phys. Lett. 64, 2235 (1994)

Non-PTL 2: S. G. Cloutier, P. A. Kossyrev and J. Xu, Nature Mater. 4, 887 (2005)

Non-PTL 3: J. M. Trombetta and G. D. Watkins, Appl. Phys. Lett. 51, 1103 (1987)

SUMMARY OF THE INVENTION

Problems to be Solved by the Invention

When a rare earth element such as Er is used, since the amount thereof reserved in nature is less than that of Si and the like, it is unclear whether stable supply in the future is possible or not.

The added Er is likely to generate defects such as point defects, line defects, loop defects and dislocations, so that the problem of decrease in emission efficiency arises.

Moreover, Er is a contamination component for conventional elements such as CMOS, and is thereby considered to be difficult to use with the diffusion line including a manufacturing device.

Accordingly, the additional process of adding Er makes it necessary to install a dedicated manufacturing line or manufacturing device, and is thereby considered to be more expensive in manufacturing cost.

With conventional light-emitting materials using crystal defects in Si, it is difficult to obtain light emission having a sharp line width of around 1.55 μm (1.50 μm to 1.60 μm), and consequently there is a problem that the emission intensity is limited to light emission of other wavelength regions.

Solutions To The Problems

In view of the background described above, the present invention is to provide a method of manufacturing an infrared light-emitting element which is composed of a Si-based Si substrate and a film capable of being formed on the Si substrate and which can be formed by conventional processes of manufacturing a semiconductor device and a manufacturing line and a manufacturing device for CMOS without using a rare earth element such as Er, wherein luminescence centers are point defects of interstitial C and interstitial O (hereinafter referred to as a C center), and the emission wavelength is only around 1.57 μm, a specific emission wavelength of the C center.

The present invention relates to a method of manufacturing an infrared light-emitting element, including the steps of forming a $SiO_2$ film on a Si substrate with C added thereto; and performing RTA treatment in an atmosphere containing oxygen, or implanting impurity ions therein and thereafter performing RTA treatment in an atmosphere containing oxygen.

Effects Of The Invention

According to the present invention, since conventional processes of manufacturing a semiconductor device for use in fabrication of LSI can be used as they are, there is no need to install a new specialized device or pay attention to the consistency of processes, so that a light source of around 1.57 μm can be manufactured conveniently at low cost.

DESCRIPTION OF EMBODIMENTS

Exemplary Embodiment

Hereinafter, an exemplary embodiment of the present invention will be explained with reference to the drawings.

Figure 1:
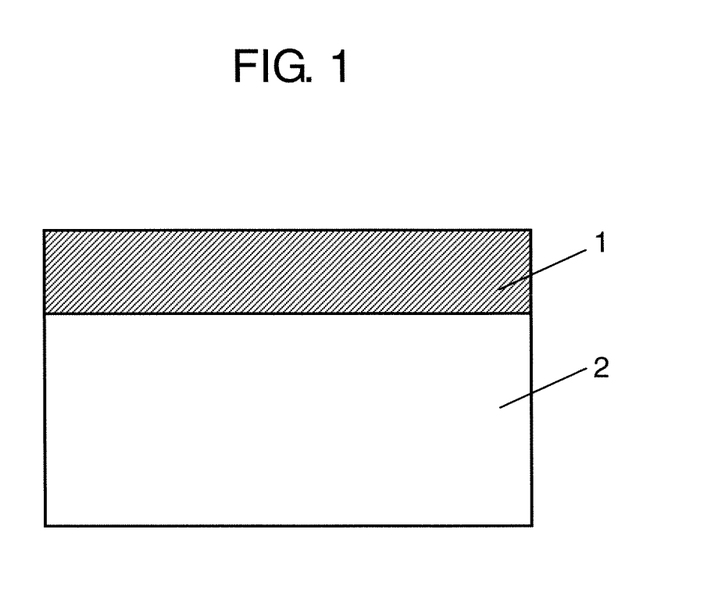
FIG. 1 shows a structure of a light-emitting element of the present invention.

FIG. 1 shows a structure of a light-emitting element of the present invention. The present exemplary embodiment has a structure in which $SiO_2$ film 2 is formed on a substrate surface of Si substrate 1, and C centers are formed in the interior of Si substrate 1.

Here, the C centers are formed by incorporating oxygen in a heat treatment atmosphere during the process of repairing crystal defects that have been formed by heat treatment and ion implantation.

Accordingly, the amount of C center depends on the amount of crystal defects formed by heat treatment and ion implantation and the amount of oxygen incorporated during the heat treatment. Therefore, in order to increase the amount of C center so as to increase the emission intensity, it is necessary to make crystal defects as many as possible as long as no amorphization is caused, in a region where oxygen to be incorporated during the heat treatment will be diffused. This can be controlled by the film thickness of the $SiO_2$ film, and the conditions of the ion implantation and the heat treatment.

Figure 2:
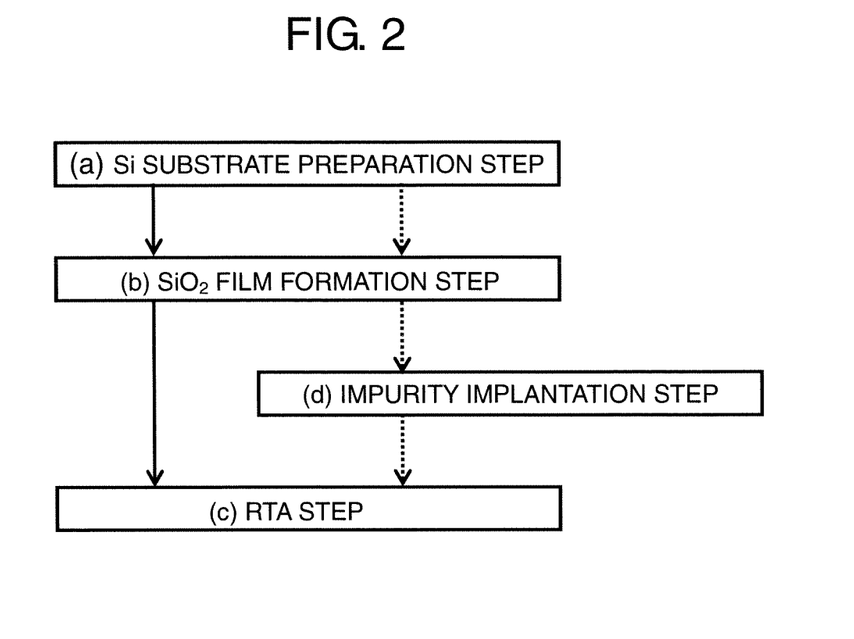
FIG. 2 is a flowchart showing a method of manufacturing a light-emitting element of the present invention.

Next, with reference to FIG. 2, a method of manufacturing an infrared light-emitting element of the present invention will be explained. This method is, i.e., a procedure to form C centers.

First, in step (a), a Si substrate containing C, one of elements constituting C centers, is prepared.

The C concentration is preferably as high as possible within the range of not exceeding the solid solubility limit in Si ($2\times10^{18}$ $cm^{-3}$), and the concentration required is in the range of between $1\times10^{15}$ $cm^{-3}$ and $2\times10^{18}$ $cm^{-3}$.

Next, in step (b), a $SiO_2$ film is formed on the silicon substrate in order to control the amount and position of crystal defects to be generated by ion implantation and heat treatment. The $SiO_2$ film can be, for example, formed under the general conditions of producing a thermally-oxidized film with a silicon process. The film thickness of the $SiO_2$ film can be controlled by adjusting the heat treatment temperature and the heat treatment time.

Then, in step (c), the Si substrate with the $SiO_2$ film formed thereon is subjected to heat treatment in an oxygen atmosphere, to form C centers. Here, attention should be paid to the fact that the formed C centers are known to be vanished with long-term heat treatment using a heat treatment furnace. Therefore, the heat treatment should be performed in a short time.

In this case, it is necessary to perform the heat treatment at high temperatures in order to ensure the amount of heat required for repairing defects other than the C centers which may block light emission from the C centers. Rapid thermal anneal (RTA) is suitable as a means of performing heat treatment at high temperatures in a short time. One example of the temperature rising rate of the RTA is between 40° C/sec and 900° C/sec. Furthermore, one example of the temperature drop rate of the RTA is between 40° C/sec and 900° C/sec.

It is to be noted that the C centers can be formed only with heat shock resulting from the rapid temperature rise during the RTA; however, it is desired to perform ion implantation of step (d) before the heat treatment in order to make crystal defects as many as possible.

As the ion species used in the ion implantation, arsenic (As), phosphorus (P), boron (B), germanium (Ge) and the like, impurities generally used in manufacturing CMOS, can be used.

The implantation energy should be selected in such a manner that the average projected range (Rp) of the implanted impurities with respect to the film thickness of the $SiO_2$ film is located in the Si substrate so that sufficient defects can be introduced into the Si substrate.

The implantation dose should be set to a value with which large defects, such as dislocations that are difficult to be repaired after the heat treatment, are not formed due to the effect of amorphization, that is, a value equal to or less than the critical dose for amorphization of the Si substrate.

In the case of performing the ion implantation, the heat treatment temperature and the heat treatment time in step (c) are not particularly limited, provided that oxygen contained in the heat treatment atmosphere can be diffused in the area where implantation defects have been formed in the silicon substrate. For example, when the target depth is set to about twice (about 200 nm) of Rp where the defect density formed by implantation is high, the heat treatment temperature may be set at 1000° C. or more, and the heat treatment time may be set between 30 seconds and 1 minute.

The concentration of the oxygen gas contained in the heat treatment atmosphere in step (c) should be optimized with consideration for the increase in thickness of the $SiO_2$ film and the amount of remained defects; however, in the above conditions, it is set to between 5% and 40% to obtain an optimum value.

Next, more specific examples will be explained.

EXAMPLE 1

As Example 1, there will be explained a method of manufacturing a light-emitting element without performing ion implantation in step (d).

First, in step (a), a commercially available Si substrate containing C in an amount of about $1\times10^{16}$ $cm^{-3}$ formed by a Czochralski (Cz) method was used as a Si substrate containing C.

In step (b), a $SiO_2$ film can be formed under the general conditions of forming a thermally-oxidized film with a silicon process. In this example, a $SiO_2$ film of 43 nm was formed by performing heat treatment at 900° C. for 55 minutes, followed by heat treatment at 1000° C. for 20 minutes.

Next, in step (c), the oxygen concentration was set to 10%, and RTA treatment was performed at 1100° C. for 30 seconds. Here, the temperature rising rate and the temperature drop rate were both 40° C./sec.

Figure 3:
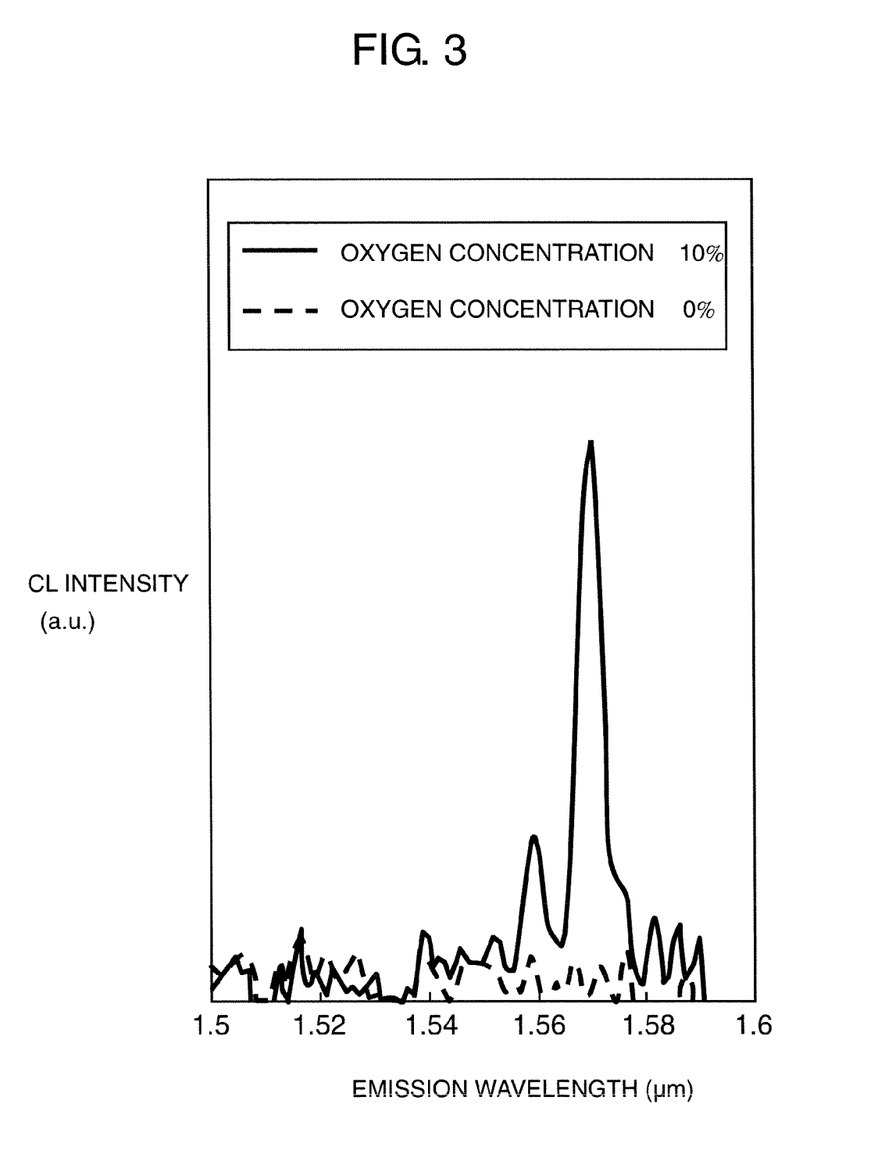
FIG. 3 shows an emission spectrum of a light-emitting element in Example 1 of the present invention.

The measurement result of the thus-formed light-emitting element by low temperature (30 K) cathodoluminescence (CL) is shown in FIG. 3. For comparison, the CL spectrum of a sample prepared under the same conditions as in Example 1, except that step (c) was performed in an atmosphere having an oxygen concentration of 0%, is also shown in FIG. 3. FIG. 3 shows that the sample of this example (oxygen concentration 10%) is observed to have an emission line at 1.57 μm to form a good light-emitting element. On the other hand, the sample of the comparative example (oxygen concentration 0%) is observed to have no peak in the emission spectrum. In addition, the sample of this example does not show any emission lines resulting from point defects, line defects, loop defects, dislocations and the like which may decrease the emission intensity of the emission line at 1.57 μm.

EXAMPLE 2

As Example 2, there will be explained a method of manufacturing a light-emitting element performing ion implantation in step (d).

In the same manner as in Example 1, in step (a), a commercially available Si substrate containing C in an amount of about $1 \times 10^{16}$ cm$^{-3}$ formed by a Czochralski (Cz) method was used as a Si substrate containing C.

The conditions of forming a SiO$_2$ film in step (b) of this example were heat treatment at 900° C. for 45 minutes, followed by heat treatment at 1000° C. for 20 minutes, and the film thickness was 10 nm.

Next, in step (d), As was implanted as impurities having a relatively high mass number and capable of causing a relatively large damage to the Si substrate with the amount implanted being small. At that time, the implantation energy of As was set to 150 keV such that Rp was about 90 nm, and the implantation dose was set to $1 \times 10^{13}$, a value smaller than the critical dose of As implantation ($8 \times 10^{13}$ cm$^{-2}$).

Then, in step (c), the oxygen concentration was set to 40%, and RTA treatment was performed at 1100° C. for 50 seconds. Here, the temperature rising rate and the temperature drop rate were both 40° C./sec.

Figure 4:
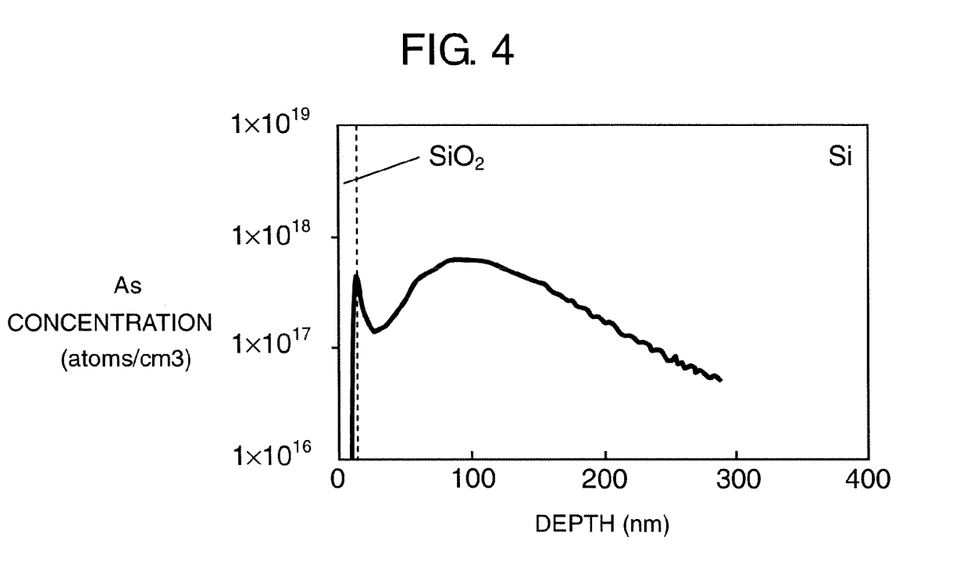
FIG. 4 shows an implantation profile of As contained in a light-emitting element of the present invention.
Figure 5:
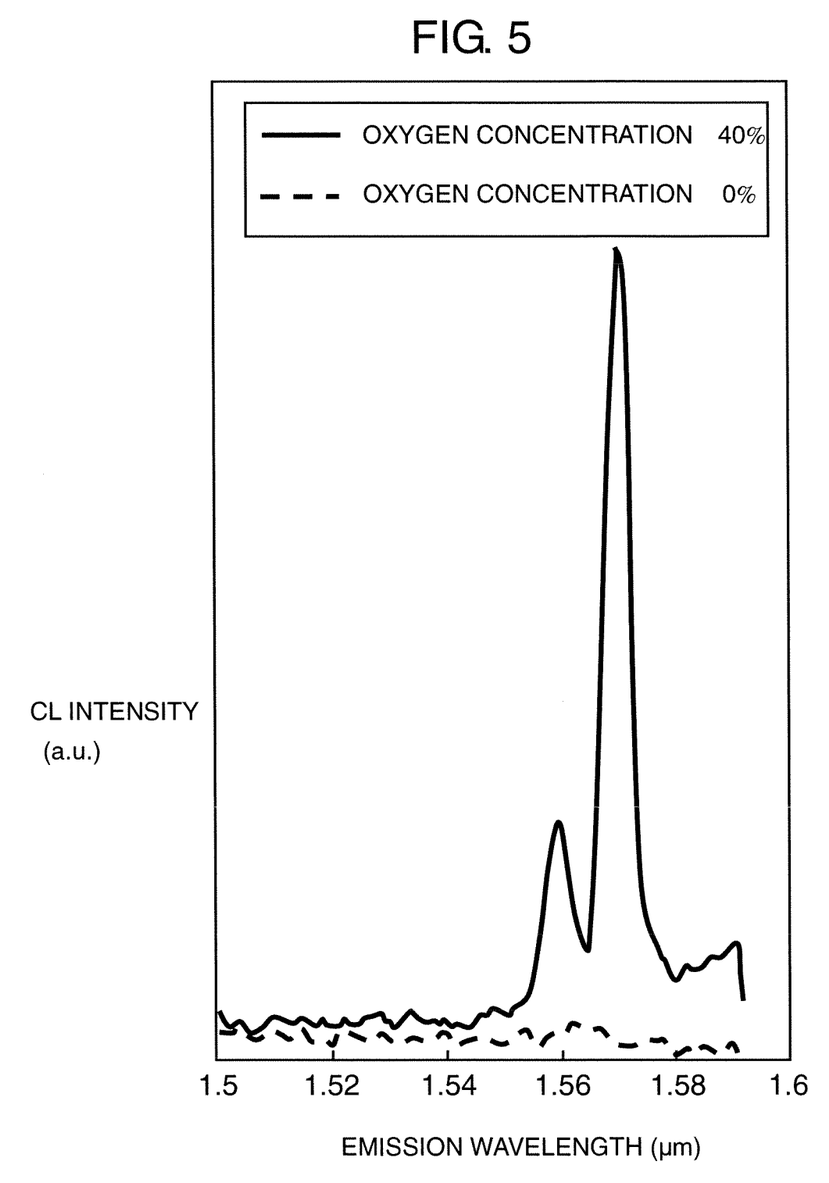
FIG. 5 shows an emission spectrum of a light-emitting element in Example 2 of the present invention.

The profile of As under the above conditions of implantation and heat treatment is shown in FIG. 4. FIG. 4 shows that the average projected range (Rp) is about 90 nm. The measurement result of the thus-formed structure by low temperature (30 K) cathodoluminescence (CL) is shown in FIG. 5 with a solid line. As a comparative example, the CL spectrum of a sample prepared under the same conditions as in Example 2, except that step (c) was performed in an atmosphere having an oxygen concentration of 0%, is also shown in FIG. 5. FIG. 5 shows that the light-emitting element of Example 2 is observed to have an emission line at 1.57 μm in the same manner as in Example 1. On the other hand, the sample of the comparative example (oxygen concentration 0%) is observed to have no peak in the emission spectrum. In addition, the sample of this example does not show any emission lines resulting from point defects, line defects, loop defects, dislocations and the like.

EXAMPLE 3

Figure 6:
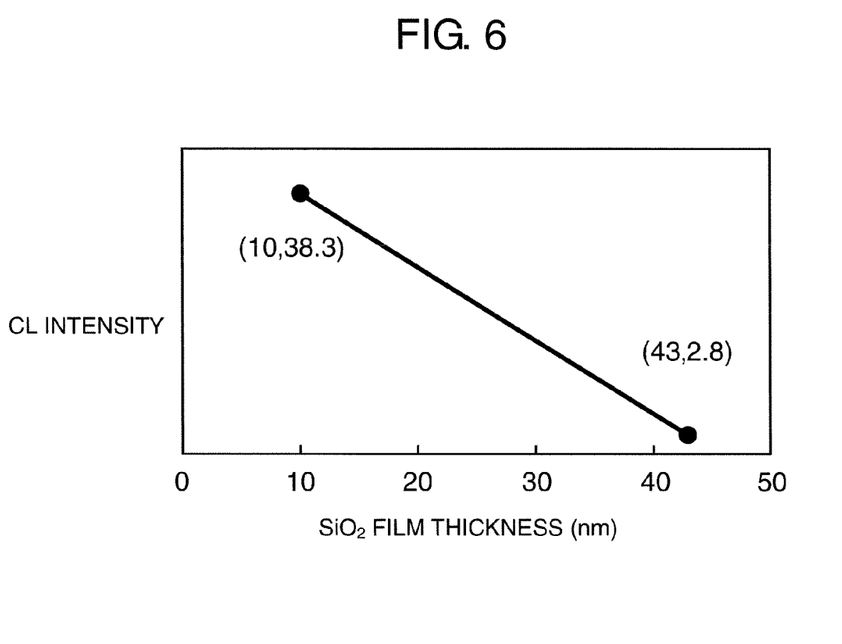
FIG. 6 shows the dependence of the emission line intensity on the $SiO_2$ film thickness in Example 3 of the present invention.

In this example, a sample was prepared by changing the film thickness of a SiO$_2$ film formed in step (b). The film thickness of the SiO$_2$ film was 10 nm or 43 nm. The experimental conditions were the same as in Example 2, except that the film thickness of the SiO$_2$ film was changed and the oxygen concentration during the RTA treatment in step (c) was set to 10%. As for the sample of this example, the dependence of the emission line intensity at 1.57 μm on the SiO$_2$ film thickness measured by low temperature (30 K) cathodoluminescence (CL) is shown in FIG. 6.

The emission line at 1.57 μm was seen in both cases where the film thickness of the SiO$_2$ film was 10 nm and where it was 43 nm. FIG. 6 shows that the control of the film thickness of the SiO$_2$ film can control the amount of C center, and as a result, the emission line intensity. The thickness of the SiO$_2$ film was made thin to be 10 nm or less, whereby greater emission intensity was obtained.

EXAMPLE 4

Figure 7:
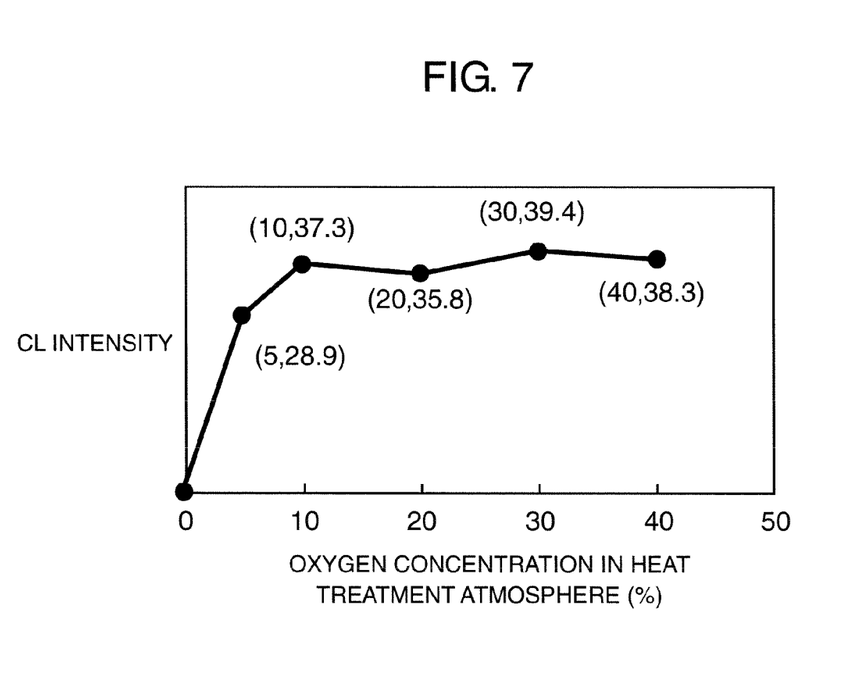
FIG. 7 shows the dependence of the emission line intensity on the concentration of oxygen contained in a heat treatment atmosphere.

In this example, a sample was prepared by changing the proportion of oxygen contained in the heat treatment atmosphere in step (c). Other experimental conditions were the same as in Example 2. In this example, the proportion of oxygen contained in the heat treatment atmosphere was 0%, 5%, 10%, 20%, 30%, and 40%. As for the sample of this example, the dependence of the emission line intensity at 1.57 μm on the concentration of oxygen contained in the heat treatment atmosphere measured by low temperature (30 K) cathodoluminescence (CL) is shown in FIG. 7. The emission line at 1.57 μm was observed when the oxygen concentration was between 5% and 40% in FIG. 7. The emission intensity increased more when the oxygen concentration was 10% or more. As the oxygen concentration was higher, the emission intensity increased more; however, when the oxygen concentration was about 30%, the emission intensity reached its saturation level.

Industrial Applicability

With the use of the method of manufacturing the light-emitting element of the present invention, since conventional processes of manufacturing a semiconductor device for use in fabrication of LSI can be used as they are, there is no need to install a new specialized device or pay attention to the consistency of processes, so that a light source of around 1.57 μm can be manufactured conveniently at low cost.

Reference Marks In The Drawings

1 Si substrate
2 SiO$_2$ film

The invention claimed is:

1. A method of manufacturing an infrared light-emitting element comprising steps of;
   (a) preparing a Si substrate containing C in an amount of between $1 \times 10^{15}$ cm$^{-3}$ and $2 \times 10^{18}$ cm$^{-3}$;
   (b) forming a SiO$_2$ film on a surface of the Si substrate; and
   (c) applying rapid thermal anneal (RTA) treatment to the Si substrate with the SiO$_2$ film formed thereon in an atmosphere containing oxygen,
   wherein the RTA treatment is performed in the atmosphere containing oxygen and an oxygen concentration is between 5% and 40%.

2. The method of manufacturing the infrared light-emitting element according to claim 1, wherein the temperature rising rate of the RTA treatment is between 40° C./sec and 900° C./sec.

3. The method of manufacturing the infrared light-emitting element according to claim 1, wherein the RTA treatment is performed at a temperature between 1000° C. and 1200° C.

4. The method of manufacturing the infrared light-emitting element according to claim 1, wherein the RTA treatment is performed for a period between 1 second and 1 minute.

5. The method of manufacturing the infrared light-emitting element according to claim 1, wherein in the RTA treatment, heat shock resulting from temperature rise during the RTA treatment causes a plurality of C-centers to be formed in an interior of the Si substrate and the infrared light-emitting element to have at least one peak emission line around 1.55 μm.

6. A method of manufacturing an infrared light-emitting element, comprising the steps of;
   (a) preparing a Si substrate containing C in an amount of between $1 \times 10^{15}$ cm$^{-3}$ and $2 \times 10^{18}$ cm$^{-3}$;
   (b) forming a SiO$_2$ film on the Si substrate;

(d) implanting ions in the Si substrate with the SiO$_2$ film formed thereon; and (e) applying rapid thermal anneal (RTA) treatment to the Si substrate with the ions implanted therein in an atmosphere containing oxygen, wherein the RTA treatment is performed in the atmosphere containing oxygen and an oxygen concentration is between 5% and 40%.

7. The method of manufacturing the infrared light-emitting element according to claim 6, wherein the temperature rising rate of the RTA treatment is between 40° C./sec and 900° C./sec.

8. The method of manufacturing the infrared light-emitting element according to claim 6, wherein the RTA treatment is performed at a temperature between 1000° C. and 1200° C.

9. The method of manufacturing the infrared light-emitting element according to claim 6, wherein the RTA treatment is performed for a period between 1 second and 1 minute.

10. The method of manufacturing the infrared light-emitting element according to claim 6, wherein the ion species used in the ion implantation is As.

11. The method of manufacturing the infrared light-emitting element according to claim 6, wherein the amount of ions implanted is $8 \times 10^{13}$ cm$^{-3}$ or less.

12. The method of manufacturing the infrared light-emitting element according to claim 6, wherein in the RTA treatment, heat shock resulting from temperature rise during the RTA treatment causes a plurality of C-centers to be formed in an interior of the Si substrate and the infrared light-emitting element to have at least one peak emission line around 1.55 μm.

\* \* \* \* \*